(No Model.)
M. R. BERGEN.
APPARATUS FOR CLEANING CELLULOSE.
No. 549,894. Patented Nov. 19, 1895.
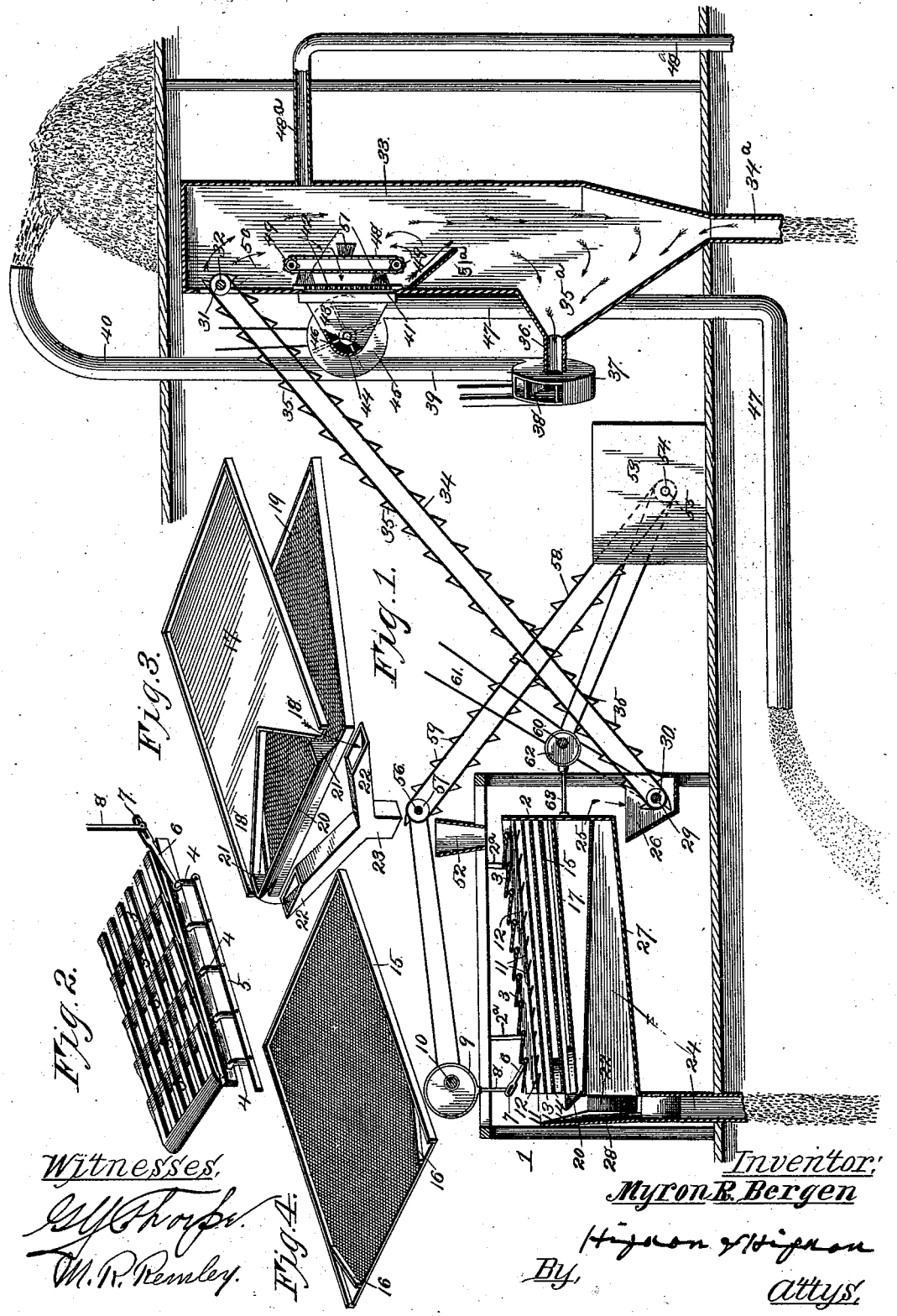
Witnesses:
Inventor:
Myron R. Bergen
By Higdon & Higdon
Attys.

UNITED STATES PATENT OFFICE.

MYRON R. BERGEN, OF LEAVENWORTH, KANSAS.

APPARATUS FOR CLEANING CELLULOSE.

SPECIFICATION forming part of Letters Patent No. 549,894, dated November 19, 1895.

Application filed March 14, 1895. Serial No. 541,834. (No model.)

*To all whom it may concern:*

Be it known that I, MYRON R. BERGEN, of Leavenworth, Leavenworth county, Kansas, have invented certain new and useful Improvements in Apparatus for Cleaning Cellulose, of which the following is a full, clear, and exact description, reference being had to the accompanying drawings, forming a part hereof.

My invention relates to apparatus for separating cellulose or the finer down-like particles of corn-chaff from the coarser parts; and the object of the invention is to provide apparatus for this purpose which is positive and reliable in operation and combines simplicity with durability and inexpensiveness of construction.

With this object in view the invention consists in certain novel and peculiar features of construction and combinations of parts, as will be hereinafter described and claimed.

In order that the invention may be fully understood, I will proceed to describe it with reference to the accompanying drawings, in which—

Figure 1 represents, partly in elevation and partly in section, an apparatus embodying my invention. Fig. 2 is a detail perspective view, on an enlarged scale, of a portion of the same. Figs. 3 and 4 are also detail perspective views of parts which will be hereinafter described.

In the said drawings, 1 designates a rectangular framework which may be composed of a series of standards and bars connecting the same, as shown, or of any other suitable or preferred construction.

2 designates a shaker, which is supported by the springs 2ª, which are secured at their upper ends to the framework in any suitable manner and at their lower ends to the sides of the said shaker. In the upper end of said shaker a number of detachable blades 3 are pivotally mounted, and are arranged so that each blade shall overlap the contiguous blade in advance, and also so that they shall occupy a plane extending forwardly and downwardly. These blades are each constructed of a series of parallel fingers arranged a suitable distance apart. The shaft of each of said blades at one side is extended vertically downward, and said shafts are pivotally connected by a link-rod 5. One of said shafts carries rigidly a crank-arm 6, provided with a longitudinal slot 7, which is engaged by a pin or bolt carried at the lower end of the rod 8, which is connected to the eccentric 9, mounted upon the shaft 10. It will be observed from this construction that as said shaft 10 rotates the eccentric will operate the arm 6, and therefore cause said agitator-blades to rise and fall, so as to open or form a way or space between them, for a purpose to be hereinafter explained.

Arranged immediately below the series of agitator-blades and occupying a parallel plane is a sieve 11, preferably of sheet metal and perforated, as shown at 12, in such manner that the portion of the plate cut out to provide the said openings 12 will lie below the same and incline downwardly and rearwardly. Arranged immediately below and parallel with the sieve 11 is a sieve 13 of comparatively fine mesh. Below said sieve and parallel therewith is a sieve 14 of still finer mesh, and below said sieve 14 is another sieve 15, the interstices of which are too fine to permit the passage of cellulose therethrough, but do permit the passage of sand and dust through the same to the inclined table 17 immediately below and parallel with said sieve 15. The discharge end of the sieve 15 is narrowed by the converging strips 16, for a purpose which will presently appear, and the table 17 is bifurcated at its front end so as to form the diverging passages 18. Said passages each diverge forwardly, so that the space between their points of discharge equals or slightly exceeds the width of the discharge end of the sieve 15 immediately above.

Arranged below the table 17 and inclined downwardly and rearwardly is a sieve 19, which is of exceedingly fine mesh, so that nothing but dust and particles nearly as fine can pass therethrough. At the front end of said sieve, which is adjacent to the front end of the table 17, it is provided with a hopper corresponding in width to the discharge end of the sieve 15. Said hopper comprises the inclined board 20 and the ends 21, so that the cellulose and dust which is discharged from the front end of the said sieve 15 drops freely into said hopper and upon the sieve 19, owing to the fact that the table immediately below is bifurcated, as hereinbefore described. At the same time it is obvious that sand and particles escaping from the table 17 by way of the converging passages 18 fall in the direction indicated by the arrows, Fig. 3, into the branch spouts 22 of a chute 23, which communicates at its lower end with the interior of the chute 24, which leads to any suitable point of discharge. The rear end of the framework 2, coincident with the discharge end of the sieve 19, is provided with an opening 25, through which the cellulose, coarser particles of the chaff, and the dust escape and drop into the hopper 26, carried by said framework 1. A second table 27 or bottom of the framework 2 inclines downwardly and forwardly below the sieve 19 and communicates also with the chute 24. Said chute may be also provided at one side with an inclined extension 28, which will catch and deflect the very coarse particles of chaff discharged from the blades 3 and the various sieves above the sieve 15 into the said chute 24. If desired, the chute 23, provided with branch arms 22, may be entirely dispensed with, as the upper end of the chute 24 will correspond in width to the various sieves. Mounted rigidly upon the shaft 29, journaled in the hopper 26, is a roller 30, and mounted rigidly upon a shaft 31, journaled in the upper end of a drum or receptacle 33, is a roller 32, and mounted upon said rollers is an inclined elevator, which comprises the apron 34 and the cups or receptacles 35 of any suitable or preferred construction. This elevator inclines from its receiving end in the hopper 26 upwardly to its discharge end in the drum or receptacle 33. Said drum or receptacle communicates at its lower end with a waste-tube 34$^a$, and is provided at a suitable point with an offsetting-chamber 35$^a$, which communicates with a tube 36, leading into a casing 37. An air-blast fan 38 is mounted in this casing, and is adapted to discharge the cellulose entering said casing, as hereinafter explained, up through the tube 39 into a separate or cellulose compartment, as shown at 40. At a suitable point above said offsetting-chamber 35$^a$ the drum or receptacle is provided with an opening 41, which is covered at its inner side by a perforated plate or screen 42 and communicates at its opposite side with a casing 43. This casing, through an opening 44, communicates with a casing 45, within which is located an air-blast fan 46. Said air-blast casing is provided with a discharge-tube 47, which leads into a waste-compartment below or to any other suitable place. Arranged vertically within said drum or receptacle and contiguous to the perforated plate is a pair of parallel sprocket-chains 48, one only of which is shown, and said sprocket-chains engage at their upper and lower ends small sprocket-wheels 49, the shaft of one pair of which is belted to the shaft 31, as shown. Connecting said chains and corresponding in width to the said perforated plate or sieve are brushes 51, preferably three in number, which are adapted to successfully engage and brush the cellulose and coarser particles of chaff from the face of said perforated plate or sieve and deposit it upon the downwardly and rearwardly inclined deflector 51$^a$ immediately below, from which it descends by gravity and by the action of the air-blast fan 38 and the air-blast entering the drum or receptacle through the pipe 48$^a$ above said deflector. Arranged vertically above the rear end of the framework 2 is a hopper 52. The chaff-supply receptacle 53 preferably is located in a plane below said hopper 52, and extending therethrough and journaled therein is a shaft 54, upon which is mounted a roller 55. A similar shaft 56 is journaled above the hopper 52 and carries a roller 57, which is connected with the roller 55 by an elevator, comprising an endless apron 58 and the the cups or receptacles 59. A shaft 60, which receives motion, preferably, from a counter-shaft by means of a belt 61, carries an eccentric 62, and operatively connecting said eccentric with the framework 2, carrying the various tables and sieves hereinbefore described, is the rod 63. Belts to operate the various shafts of the mechanism may be arranged as shown, or in any other suitable or preferred manner. The fan-shafts, however, are preferably provided with separate belts, though not necessarily so, in order that they may rotate at the high speed required.

In operation the chaff is deposited within the receptacle 53 and is conveyed by the elevator composed of the apron 58 and cups 59 to the hopper 52, from which it descends upon the agitator-blades 3. The longitudinal reciprocation of the framework 2, caused by the eccentric 62, now causes said chaff to work its way gradually toward the front end of the series of agitator-blades, and simultaneously said blades are caused to pivotally operate in a manner hereinbefore described. This operation permits the sand, cellulose, and all of the product, except the coarsest particles, to drop between said blades down upon the sieve immediately below, while the said coarser particles are discharged beyond the front end of said series of blades and enter the waste-chute 24. The continuous agitation of the framework 2 now grades the product through the various sieves 11, 13, and 14 until all but the sand, cellulose, the fine chaff, and the dust is discharged from the front ends of the said various sieves into the waste-chute 24, while the said enumerated products descend upon the sieve 15, through which the sand and particles of equal bulk pass to the table 17 below and are discharged through the converging passages 18 into the chute 24 by way of the chute 23. The cellulose, other fine particles of chaff, and dust are now discharged together into the hopper of and upon the sieve 19, where it is again agitated to further clean the cellulose. The particles escaping through the sieve 19 are caused by the inclined table or bottom 27 of the framework to enter the chute 24 also, while the cellulose, other fine chaff, and dust escape by way of the opening 25 into the hopper 26, from which it is carried by the elevator and discharged into the upper end of the drum or receptacle 23. As it descends, the air-blast through the pipe 48ª forces the dust against the perforated plate or sieve 42, where it is acted upon by the suction created by the fan 46, and is discharged by the blast from said fan through the pipe 47. It is obvious that large quantities of cellulose and other fine chaff will be caused by the combined action of the air-blast fan 46 and the air-blast through the pipe 48ª to come in contact with and adhere to the perforated plate or sieve 42, and as this would interfere with the free passage of the dust through said plate or sieve I have provided the traveling brushes 51, which, passing downwardly in contact with said plate or sieve in quick succession, keep the same practically clean and sweep all the particles of cellulose and chaff down upon the deflector 49 and below the direct action of said blast. The small quantity of dust also swept down will be caused by said blast to rise in the direction indicated by the featherless arrows and pass through said perforated plate or sieve. As the cellulose and other fine chaff descend past the deflector 51ª, the lighter and down-like product, which is the cellulose, is drawn in the direction indicated by the arrows through the tube 36 into the casing 37, while the heavier particles continue on down through the escape-tube 34ª. The suction action of the fan 38 extends into the tube 34ª, so as to prevent the escape practically of any of the cellulose, and the same is discharged through the pipe 39 into the cellulose compartment, wherever located, as will be readily understood.

From the above description it will be apparent that I have produced an apparatus for separating cellulose from other particles of chaff and from dust, dirt, &c., which is positive and reliable in operation and simple and inexpensive of construction.

Having thus described my invention, what I claim as new, and desire to secure by Letters Patent, is—

1. In a cellulose apparatus, a receptacle or drum, an elevator communicating with the upper end of the same, a perforated plate or sieve internally covering an opening in the same below the discharge end of said elevator, a casing communicating with said opening externally of the drum or receptacle, a second casing communicating therewith, a fan located in said casing, a discharge-tube extending from said fan-casing, an air-blast pipe communicating with said drum or receptacle, at the opposite side from said perforated plate or sieve, traveling brushes operating within said drum or casing and upon the inner face of said perforated plate or sieve, and a deflector inclining downwardly and rearwardly from the lower end of said perforated plate, substantially as set forth.

2. In a cellulose apparatus, a receptacle or drum, having an opening internally covered by a perforated plate or sieve, an offsetting chamber below the same, an escape or discharge tube below said chamber, and an inclined deflector interposed between the perforated plate or sieve and said offsetting chamber, a fan casing communicating with the drum through the perforated plate or sieve and provided with a rotating fan and a discharge-tube, a fan-casing communicating with the said offsetting chamber, and also provided with a rotating fan and a discharge-tube, an air-blast pipe communicating with the drum opposite to the perforated plate or sieve, an endless chain traveling in the drum and provided with a series of brushes which successively sweep clinging particles from the inner face of the perforated plate or sieve down upon said deflector, and an endless elevator communicating with the drum above the said perforated plate or sieve, substantially as set forth.

In testimony whereof I affix my signature in the presence of two witnesses.

MYRON R. BERGEN.

Witnesses:
M. R. REMLEY,
G. Y. THORPE.